United States Patent
Wang

Patent Number: 5,450,527
Date of Patent: Sep. 12, 1995

[54] METHOD FOR CONVERTING AN EXISTING EXPERT SYSTEM INTO ONE UTILIZING ONE OR MORE NEURAL NETWORKS

[75] Inventor: Shay-Ping Wang, Long Grove, Ill.

[73] Assignee: Motorola, Inc., Schaumburg, Ill.

[21] Appl. No.: 129,823

[22] Filed: Sep. 30, 1993

[51] Int. Cl.⁶ .................................. G06F 15/18
[52] U.S. Cl. ........................ 395/22; 395/11; 395/21; 395/50; 395/52
[58] Field of Search ............... 395/11, 21, 22-25, 395/27, 51, 50, 52

[56] References Cited

U.S. PATENT DOCUMENTS

| | | | |
|---|---|---|---|
| 5,129,037 | 7/1992 | Kirk et al. | 395/22 |
| 5,179,631 | 1/1993 | Guddanti et al. | 395/22 |
| 5,241,620 | 8/1993 | Ruggiero | 395/22 |
| 5,247,584 | 9/1993 | Krogmann | 395/22 |

OTHER PUBLICATIONS

Fu, "Building expert systems on neural architecture"; First IEEE International conference on Artificial Neural Networks, pp. 221-225, 16-18, Oct. 1989.

Rabelo et al, "Synergy of artificial neural networks and knowledge-based expert systems for intelligent fms scheduling"; IJCNN International joint conference on neural networks, pp. 359-366, 17-21 Jun. 1990.

Hudlli et al., "A neural network based expert system model"; Third international conference on tools for artificial intelligence TAI 91', pp. 145-149, 10-13, Nov. 1991.

*Primary Examiner*—Allen R. MacDonald
*Assistant Examiner*—Tariq Hafiz
*Attorney, Agent, or Firm*—Bruce E. Stuckman; Walter W. Nielsen

[57] ABSTRACT

A technique for converting an existing expert system into one incorporating one or more neural networks includes the steps of separating the knowledge base and inference engine of the existing expert system, identifying the external and internal inputs and outputs, identifying subsystems from the inputs and outputs, using a neural network for each subsystem, training each neural network to learn the production rules of its associated subsystem, and computing exact or interpolated outputs from a given set of inputs. Each neural network utilizes a training algorithm which does not require repetitive training and which yields a global minimum to each given set of inputs.

31 Claims, 6 Drawing Sheets

|  | $x_1$ | $x_2$ | $z_1$ |
|---|---|---|---|
| EXAMPLE 1 | PL | ZO | PL |
| EXAMPLE 2 | PL | PL | NL |
| ⋮ | | | |
| EXAMPLE $n_1$ | NL | NL | PL |

FIG. 4

|  | $x_1$ | $x_2$ | $z_1$ |
|---|---|---|---|
| EXAMPLE 1 | +1 | 0 | 1 |
| EXAMPLE 2 | 1 | 1 | −1 |
| ⋮ | | | |
| EXAMPLE $n_1$ | −1 | −1 | 1 |

FIG. 5

|  | $z_1$ | $x_3$ | $y$ |
|---|---|---|---|
| EXAMPLE 1 | PL | PL | NL |
| EXAMPLE 2 | PM | ZO | NM |
| ⋮ | | | |
| EXAMPLE $n_3$ | NL | NL | PL |

FIG. 6

|  | $z_1$ | $x_3$ | $y$ |
|---|---|---|---|
| EXAMPLE 1 | 1 | 1 | −1 |
| EXAMPLE 2 | 0.5 | 0 | −0.5 |
| ⋮ | | | |
| EXAMPLE $n_3$ | −1 | −1 | 1 |

|  | NL | NS | ZO | PS | PL |
|---|---|---|---|---|---|
| NL | PL | PL | PL | PS | ZO |
| NS | PL | PL | PS | ZO | NS |
| $x_2$ ZO | PL | PS | ZO | NS | NL |
| PS | PS | ZO | NS | NL | NL |
| PL | ZO | NS | NL | NL | NL |

|  | −1.0 | −0.5 | 0 | +0.5 | +1.0 |
|---|---|---|---|---|---|
| −1.0 | +1.0 | +1.0 | +1.0 | +0.5 | 0 |
| −0.5 | +1.0 | +1.0 | +0.5 | 0 | −0.5 |
| $x_2$ 0 | +1.0 | +0.5 | 0 | −0.5 | −1.0 |
| +0.5 | +0.5 | 0 | −0.5 | −1.0 | −1.0 |
| +1.0 | 0 | −0.5 | −1.0 | −1.0 | −1.0 |

METHOD FOR CONVERTING AN EXISTING EXPERT SYSTEM INTO ONE UTILIZING ONE OR MORE NEURAL NETWORKS

RELATED INVENTIONS

The present invention is related to the following inventions which are assigned to the same assignee as the present invention:

(1) "Neural Network and Method of Using Same", having Ser. No. 08/076,601, filed Jun. 14, 1993;

(2) "Method for Structuring an Expert System Utilizing One or More Neural Networks", having Ser. No 08/129,275, filed concurrently herewith.

TECHNICAL FIELD

This invention relates generally to expert systems and, in particular, to converting an existing expert system into one or more neural networks.

BACKGROUND OF THE INVENTION

In recent years, expert systems have been used in many applications which have traditionally been carried out using complex algorithmic approaches. These applications include medical diagnosis, financial analysis, electronics design, nuclear power plant monitoring and control, oil exploration, etc. Expert systems have also been used for interpretation, prediction, planning, monitoring, debugging, repair, and instruction. The surge in popularity of expert systems is mainly due to their simplicity in modeling complicated systems by Production Rules (i.e. IF/THEN rules) and to their capability in recommending appropriate actions by inference (or search).

Figure 1:
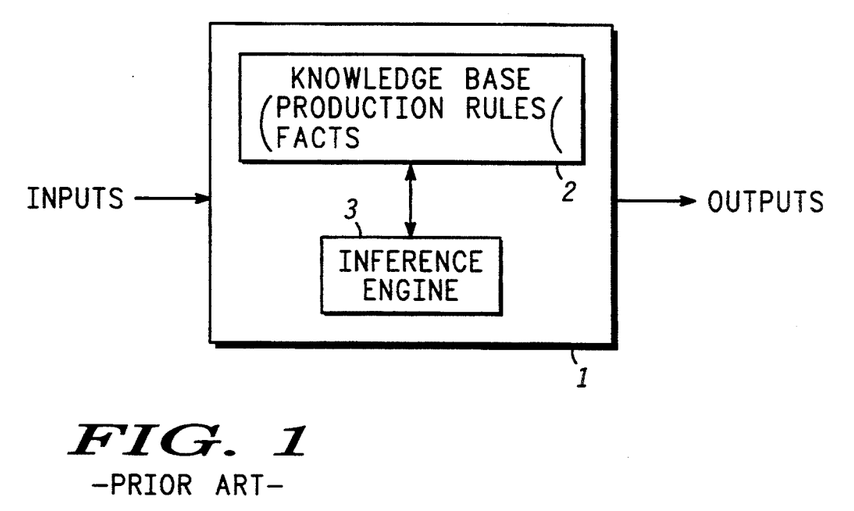
FIG. 1 shows a conceptual diagram illustrating a conventional expert system.

FIG. 1 shows a conceptual diagram illustrating a conventional expert system 1 which comprises two modules. A first module 2 is a Knowledge Base, which comprises a group of Production Rules (which typically are IF/THEN statements) and Facts. A second module 3 is an Inference Engine which makes decisions using the Production Rules and the given Facts. The expert system receives Inputs and generates Outputs using the Knowledge Base 2 and Inference Engine 3.

To date, however, the success of known existing expert systems has been somewhat diminished because of the following reasons:

First, known expert systems are too "brittle" for real-world applications which are noisy and uncertain. Specifically, the performance of an expert system rapidly degrades when the value of an Input is close to the Input bounds.

Clearly, such brittleness is inappropriate for many applications (e.g. stock market investment, medical diagnosis, etc.). Although it is known to improve the robustness of an expert system by increasing the number of Production Rules, this slows down the decision-making process and aggravates maintenance problems (due to the sheer number of Production Rules to be kept track of).

Secondly, existing expert systems are usually too slow in decision-making for high-speed dynamic systems. This is because the Inference Engine needs to match the Facts to the Production Rules to make a decision. This pattern search can be very exhaustive, repetitive, and extremely time-consuming. This is illustrated, for example, in the extensive backward and/or forward chaining operations required, as discussed in *Guide to Expert Systems*, Donald A. Waterman, Edison-Wesley, 1986, Chapter 7, pages 66–69. Forward-chaining is very slow, because it is necessary to check all the rules. It will be appreciated that the known technique of backward-chaining is more efficient but involves a more complicated Inference Engine.

Because known expert systems are both brittle and relatively slow, they are rarely used in real-time applications.

Related Invention No. 2, which is directed to a method for structuring an expert system utilizing one or more neural networks, offers an excellent alternative solution to the above-mentioned two problems of existing expert systems. However, existing expert systems often have required very significant time and money to develop, so in many cases it would be imprudent to discard them outright.

Therefore, there is a substantial need to be able to readily convert an existing expert system into an expert system comprising one or more neural network that are both robust enough and fast enough to handle a wide spectrum of business and real-time applications.

SUMMARY OF INVENTION

The present invention thus comprises a method for converting an existing expert system into one utilizing one or more neural networks. First, the knowledge base of the existing expert system is separated from its inference engine. Then the external and internal inputs and outputs of the existing expert system are identified. Once the external and internal inputs and outputs have been identified, one or more subsystems are identified, each of which produces at least one output (which may be either internal or external) from a group of inputs (which also may be either internal or external). The temporal or logical sequence of the subsystems is then identified. A neural network is then provided for each subsystem.

Each neural network is then trained; i.e. it learns the Production Rules associated with its related subsystem. Each neural network utilizes a training algorithm which does not require repetitive training and which yields a global minimum to each given set of Input variables.

Once the neural networks have been trained, the system is ready for production. In response to Inputs, it produces one or more exact and/or interpolated Outputs, either in real-time applications or non-time-critical applications.

In the expert system of the present invention, each neural network, which learns a group of Production Rules for defuzzification, produces excellent interpolated Output, thereby significantly enhancing the robustness of the converted expert system.

Thus it is an advantage of the present invention to provide a method for converting an existing expert system into one utilizing one or more neural networks. The neural networks may be implemented either in software or hardware.

It is likewise an advantage of the present invention to provide a method which uses a neural network to learn a group of Production Rules of a subsystem of an existing expert system.

It is additionally an advantage of the present invention to provide a method for creating a converted expert system which produces exact and/or interpolated outputs from a given set of inputs.

It is also an advantage of the present invention to provide a converted expert system having one or more neural networks which implicitly process a plurality of Production Rules in parallel.

It is another advantage of the present invention to provide a converted expert system that is very robust.

It is also an advantage of the present invention to provide a converted expert system that is extremely easy to tune, because it normally has only one variable to tune.

It is a further advantage of the present invention to provide a converted expert system that can control a large/complex system by massive parallel processing.

According to one aspect of the invention, there is provided a method for converting an existing expert system into an expert system having one or more neural networks. The existing expert system comprises a plurality of external inputs, a plurality of internal inputs, a plurality of internal outputs, at least one external output, a knowledge base, and an inference engine. The method comprises the steps of: (a) separating the knowledge base from the inference engine of the existing expert system; (b) identifying the external inputs and the external output (s) of the existing expert system; (c) identifying the internal inputs and the internal outputs of the existing expert system; (d) grouping the inputs and outputs identified in steps (b) and (c) into related subsystems of the existing expert system; and (e) providing a neural network for each of the subsystems.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DESCRIPTION OF A PREFERRED EMBODIMENT

Figure 2:
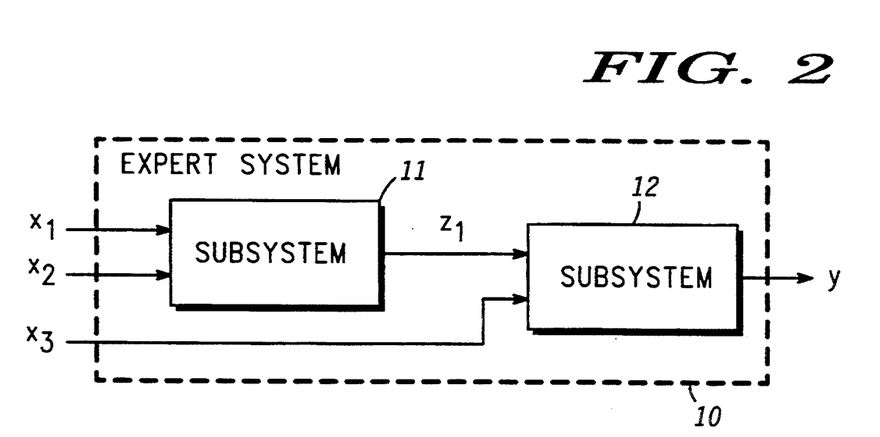
FIG. 2 shows a conceptual diagram illustrating how groups of Production Rules, or subsystems, which make up an expert system to be converted, a implemented with one or more neural networks, according the present invention.

FIG. 2 shows a conceptual diagram illustrating how groups of Production Rules, or subsystems, which make up an expert system to be converted, are implemented with one or more neural networks, according to the present invention.

In FIG. 2 an existing expert system 10 is shown as having three external Inputs $x_1$, $x_2$, and $x_3$ and one external Output y. Existing expert system 10 is also shown conceptually as comprising two subsystems 11 and 12. Subsystem 11 receives external Inputs $x_1$ and $x_2$ and generates an internal Output $z_1$. Subsystem 12 receives internal Input $z_1$ and external Input $x_3$, and it generates external Output y.

In order to convert an existing expert system into a neural network, we first need to identify the subsystems of the expert system, using the given Production Rules. This is done by the following steps:

(a) The Inputs and Outputs that are external to the existing expert system are identified. It is noted that these Inputs and Outputs are usually known, even without reference to the given Production Rules. (For example, in the existing expert system shown in FIG. 2, discussed above, the external Inputs are $x_1$–$x_3$, and the external Output is y.)

(b) The Inputs and Outputs that are internal to the existing expert system are identified, using the given Production Rules, which provide the temporal or logical relationship among all input and output variables within the existing expert system.

The guidelines for identifying internal inputs/outputs are: (1) they are not external inputs/outputs, which have already been identified in step (a) above; (2) internal inputs are usually 0 found in the premise of a production rule, (i.e. the "IF" portion); and (3) internal outputs are usually found in the results of a production rule (i.e. the "THEN" portion). It should also be noted that (4) the internal outputs of one subsystem may be internal inputs to another subsystem (e.g. in FIG. 2 $z_1$ is both an internal Output and an internal Input); (5) a subsystem has well-defined input/output sets; and (6) a subsystem may have only one rule.

From steps (a) and (b) we can identify a plurality of subsystems (as shown, for example, by subsystems 11 and 12 in FIG. 2) which comprise the existing expert system.

It will be appreciated that an existing expert system comprises a large bundle of Production Rules. Through the method of the present invention these rules are orderly grouped into a plurality of subsystems, each of which are governed by a selected set of the given Production Rules.

Using the above-described method, with regard to FIG. 2, we then represent each subsystem of the existing expert system by a neural network. In a preferred embodiment, each neural network is of the type disclosed in Related Invention No. 1, the operation of which is based upon a polynomial expansion. For a given set of external Inputs, at least one Output is computed for each neural network by substituting each network's Inputs into its corresponding polynomial expansion and solving for the corresponding Output. At least one of such solved Outputs represents an external Output of the converted expert system. The entire conversion process is explained with reference to FIG. 3 below.

Figure 3:
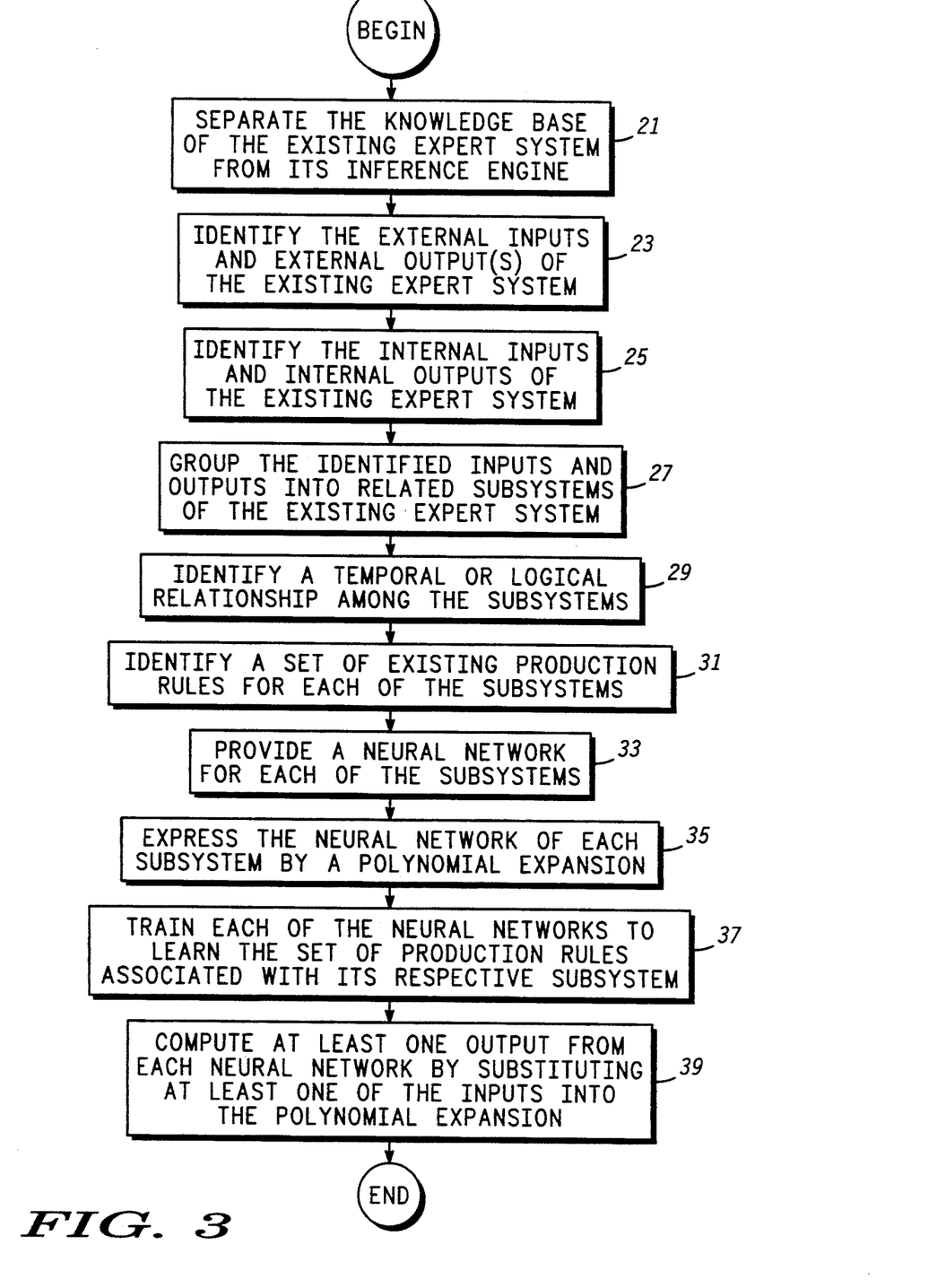
FIG 3 shows a flow diagram of a method for converting an existing expert system into an expert system having one or more neural networks in accordance with the present invention.

FIG. 3 shows a flow diagram of a method for converting an existing expert system into an expert system having one or more neural networks in accordance with the present invention. First, referring to box 21, the knowledge base of the existing expert system is separated from its inference engine. Usually they are already separate, in that the knowledge base is provided in the form of a data file, while the inference engine is provided in the form of logic.

Next, in box 23 the external Inputs and Outputs of the existing expert system are identified. Normally whether Inputs and Outputs are external or internal can be explicitly determined by inspection of the Production Rules.

Next, in box 25 the internal Inputs and internal Outputs of the existing expert system are identified, using the guidelines given earlier.

Next, in box 27 related Inputs and Outputs are grouped. Each group of related Inputs and Outputs corresponds to a related subsystem of the existing expert system. For example, regarding FIG. 2, it can be readily determined that external Inputs $x_1$ and $x_2$ and internal Output $z_1$ are related, since Output $z_1$ is dependent upon Inputs $x_1$ and $x_2$ according to the Production Rules for the existing expert system. Thus external Inputs $x_1$ and $x_2$ and internal Output $z_1$ are represented by a subsystem.

Next, in box 29 the temporal or logical relationship between each subsystem is determined. This can be readily determined from the previously identified internal and external Inputs and Outputs. For example, regarding subsystems 11 and 12 in FIG. 2, subsystem 11 must be calculated before subsystem 12 because internal Output $z_1$ from subsystem 11 is an Input to subsystem 12.

Next, in box 31 the Production Rules that pertain to each subsystem are identified.

Next, in box 33 a neural network is defined for each set of Production Rules. As shown in box 35, the neural network of each subsystem is expressed in the form of a polynomial expansion.

Next, in box 37 each neural network is trained to learn the set of Production Rules associated with its respective subsystem. This includes the steps of computing the weights of each neural network for its given input and output variables.

Finally, in box 39 at least one Output is computed from each neural network by substituting at least one Input into the corresponding polynomial expansion. The Output may be either an exact value or an interpolated value.

Figure 4:
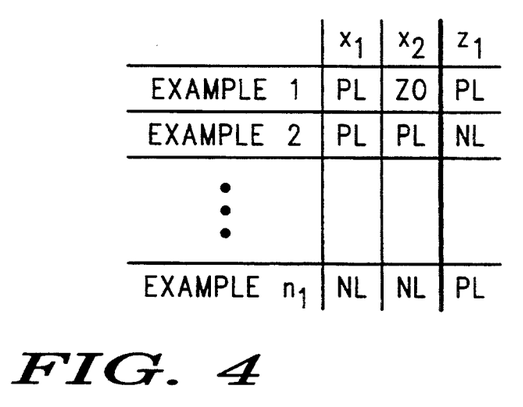
FIG. 4 shows a table illustrating the Production Rules for subsystem 11 of the existing expert system shown in FIG. 2.
Figure 6:
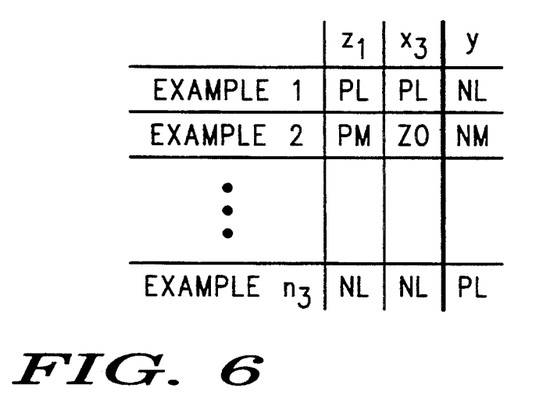
FIG. 6 shows a table illustrating the Production Rules for subsystem 12 of the existing expert system shown in FIG. 2.

FIG. 4 shows a table illustrating the Production Rules for subsystem 11 of the existing expert system shown in FIG. 2, and FIG. 6 shows a table illustrating the Production Rules for subsystem 12 of the existing expert system shown in FIG. 2.

In FIGS. 4 and 6 the expressions PL, PM, Z0, NM, and NL represent an arbitrary set of N possible values for a given Input or Output. In FIG. 4, N is chosen to be five, so there are five possible values for a given Input or Output, represented by the values PL, PM, Z0, NM, and NL. It will be understood that there may be more or less than five possible values for a given Input or Output, depending upon the particular application.

In FIG. 4, NL represents a "negative large" value with respect to normal values of the variables; NS is a "negative small" value; Z0 is a zero value; PS is a "positive small" value; and PL is a "positive large" value.

There are $n_1$ Production Rules or Examples shown in FIG. 4. For example, the first Example is IF $x_1$ =PL, $x_2$ =Z0, THEN $z_1$ =PL.

Figure 5:
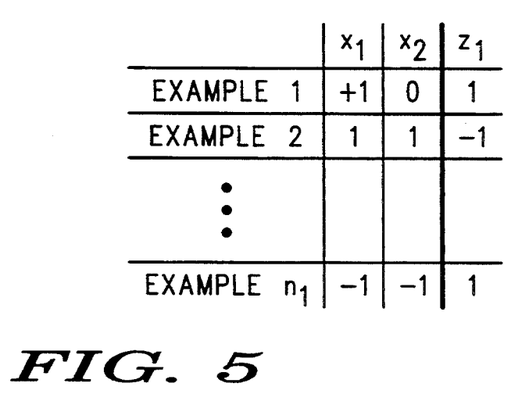
FIG. 5 shows quantified values for the table shown in FIG. 4.

FIG. 5 shows quantified values for the table shown in FIG. 4. For example, PL=+1, PM=+0.5, Z0=0, NM=−0.5, and NL=−1.0.

In similar fashion, FIG. 6 shows a table illustrating the Production Rules or Examples for subsystem 12 of the existing expert system shown in FIG. 2. Likewise, FIG. 7 shows quantified values for the table shown in FIG. 6.

It will be appreciated that, regarding the Production Rules, any desired logical relationships may be employed to express the relationships between the Inputs and Outputs.

Figure 7:
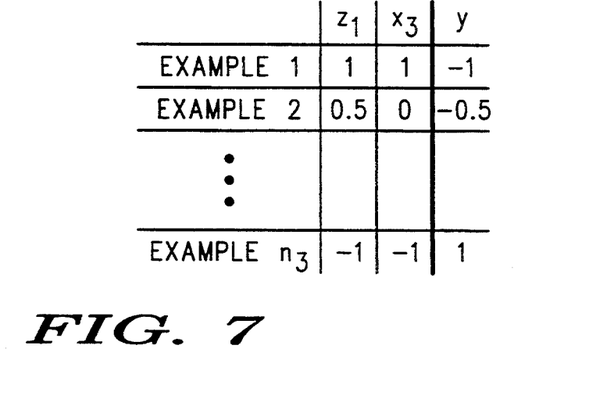
FIG. 7 shows quantified values for the table shown in FIG. 6.

Regarding FIGS. 5 and 7, the general process of transformation from x' to x (which=f(x')) may be referred to as normalization, meaning that the absolute value of x is between 0 and 1.

Figure 8:
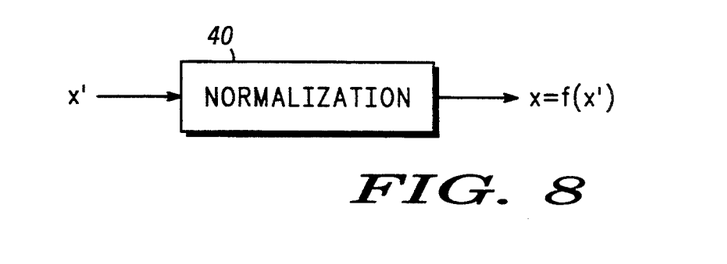
FIG. 8 shows a conceptual diagram of the normalization of an Input value $x'$ to a normalized value x having a value between $-1$ and $+1$.

FIG. 8 shows a conceptual diagram of the normalization of an Input value x' to a normalized value x having a value between −1 and +1. The normalization is performed by appropriate, well-known means 40.

It will be understood, for example, regarding the Inputs xi shown in FIG. 2, that if such Inputs need to be normalized, normalization will be carried out by suitable means. In a preferred embodiment the function f(x') is a straight line given by $$x=f(x') \qquad \text{Equation 1}$$

$$x=ax'+b \qquad \text{Equation 2}$$

wherein $|x| \leq 1$ in a preferred embodiment. It will be understood that $|x|$ may be greater than 1 in other implementations.

It will also be understood that normalization is a general process which is recommended but may not be required for special cases.

While in a preferred embodiment, the function f(x') is continuous, it will be understood that discontinuous functions may also be used.

Operation of Preferred Embodiment

In the present invention, for a given subsystem or group of Production Rules the generation of Outputs from Inputs is a three-stage process: (1) normalizing Inputs as described with reference to FIG. 8, (2) training the network, and (3) computing the interpolated Outputs from the neural network associated with such subsystem.

This three-stage process will be explained below.

Normalization of Inputs

Figure 9:
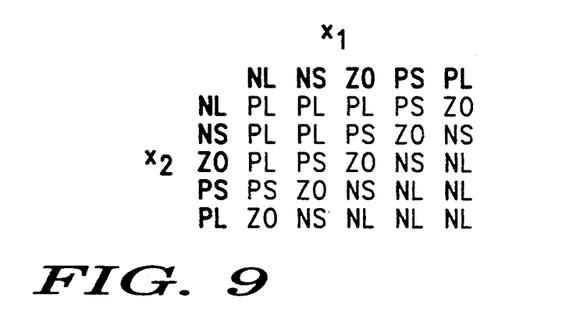
FIG. 9 shows Production Rules in table form for a process control problem controlled by an expert system.

FIG. 9 shows Production Rules in table form for a process control problem controlled by an existing expert system. This problem has two Inputs and one Output. For two given variables $x_1$ and $x_2$, the desired Output response y is illustrated by the table of FIG. 9.

In FIG. 9, NL represents a "negative large" value with respect to normal values of the variables $x_1$ and $x_2$ about their respective average, mean, or other selected centerpoint values; NS is a "negative small" value; Z0 is a zero value; PS is a "positive small" value; and PL is a "positive large" value.

This table represents twenty-five Production Rules. For example, with reference to the upper left-hand corner of FIG. 9 the corresponding Production Rule is:

$$\text{IF } x_1 = \text{NL AND } x_2 = \text{NL, THEN } y = \text{PL} \qquad \text{Equation 3}$$

And so on. It will be understood that for an existing expert system the Production Rules have already been determined and are known. In general, the Production Rules are derived from the practitioner's experience and/or knowledge about the problem to be solved. It will be understood that while it may be advantageous to utilize Production Rules to tackle a problem, it should be noted that Production Rules for an existing expert system are often very brittle (i.e. the Output cannot be interpolated but must be a specified value). Increasing the number of Production Rules improves the robustness of the expert system at the cost of computational complexity and maintenance difficulty.

Figure 10:
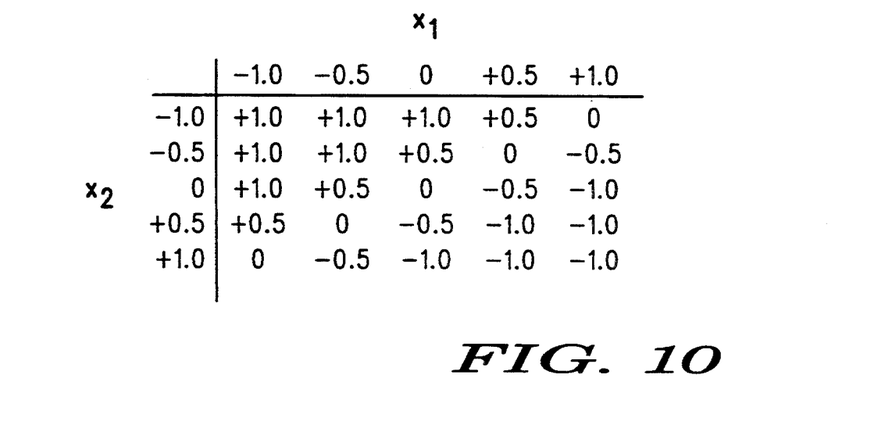
FIG 10 shows quantified values for the table shown in FIG. 9.

FIG. 10 shows quantified values for FIG. 9. The variable $x_1$ is a continuous function of $x_1'$. For example, $x_1$ is $f(x_1')$, as shown in FIG. 2. The same holds true for the relationship between $x_2$ and $x_2'$, it being understood that different functions may apply to $x_1$ and $x_2$, respectively.

For the Input variables $x_1$ and $x_2$ we choose values for PL, PS, Z0, NS, and NL between $-1$ and $+1$. In this application, we choose PL$=+1.0$; PS$=+0.5$; Z0$=0$; NS$=-0.5$; and NL$=-1.0$. It will be understood that other appropriate values may be chosen for PL (e.g. $+0.98$ or $+0.95$), PS (e.g. $+0.51$ or $+0.48$), Z0, NS, and NL, and that there may be more or less than five possible values for a given input or output variable.

For the desired. Output response y we choose PL$=+1.0$; PS$=0.5$; Z0$=0$; NS$=-0.5$; and NL$=-1.0$. It will be understood that in this case the output response y has been normalized, using a process similar to that described regarding the normalization of Input values, so that it can be fed as an Input variable into another subsystem also employing a neural network, but that in the general case the Output of the neural network does not have to be normalized.

The twenty-five Production Rules in FIG. 10 are now quantified. For example, by substituting values of NL for $x_1$, and NL for $x_2$, and PL for y in Equation 3, we get:

$$\text{IF } x_1 = -1 \text{ AND } x_2 = -1, \text{ THEN } y = +1 \qquad \text{Equation 4}$$

Of course, these values may be tuned, depending upon the application.

Training the Neural Network

Training the neural network associated with a given subsystem or group of Production Rules comprises two steps: (1) defining the number of neurons in the network to be less than or equal to the number of Production Rules of such subsystem, although it will be understood that the present invention may be implemented with a greater number of neurons than the number of Production Rules in the relevant subsystem; (2) computing the weights of the neural network, in the manner referred to in Related Invention No. 1.

After training has been completed, the network is ready for implementation.

Interpolation of Outputs

Figure 11:
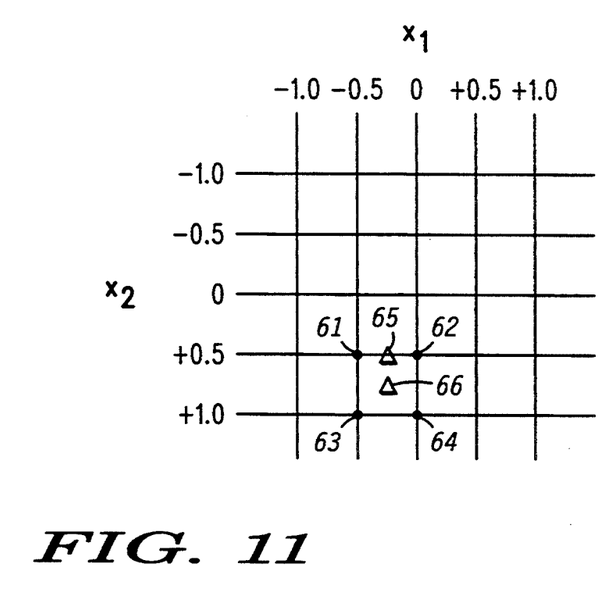
FIG. 11 shows an example of interpolation of the Outputs from a neural network used in a converted expert system of the present invention.

FIG. 11 shows an example of interpolation of the Outputs from a neural network used in a converted expert system of the present invention. In FIG. 11, each intersection, e.g. intersection 61, 62, 63, or 64, represents an "example" (i.e. an Input/Output set, such as $x_1 = -0.5$, $x_2 = +0.5$, $y = 0$ in FIG. 10).

If the Input values $x_1$ and $x_2$ are equal to the Input values of one of the twenty-five examples, the Output y of the network will be identical or very close to the Output in the example. For instance if $x_1 = -0.5$ and $x_2 = +0.5$, then the network Output y will be identical or very close to 0.

If the Input values $x_1$ and $x_2$ are midway between examples 61 and 62 (i.e. at point 65), the Output y of the network will be identical or very close to the average of the Outputs corresponding to examples 61 and 62. For instance if $x_1 = -0.25$ and $x_2 = +0.5$, then the network Output y will be identical or very close to $(0+(-0.5))/2 = -0.25$.

Likewise, if the Input values $x_1$ and $x_2$ are at the center of examples 61-64 (i.e. at point 66), the Output y of the network will be identical or very close to the average of the Outputs corresponding to examples 61-64. For instance if $x_1 = -0.25$ and $x_2 = +0.75$, then the network Output y will be identical or very close to $(0+(-0.5)+(-0.5)+(-1.0))/4 = -0.5$.

Thus the neural network produces either an actual Output or an interpolated Output for a given set of Input values.

Implementation of an Expert System Utilizing A Neural Network

In a preferred embodiment, there are two steps for computing or interpolating the Outputs: (1) normalizing the Inputs; and (2) generating the Outputs by providing the normalized Inputs to the network.

For details concerning the computation of Outputs, refer to Related Invention No. 1 and the following description.

Preferred Embodiment of Neural Network

Figure 12:
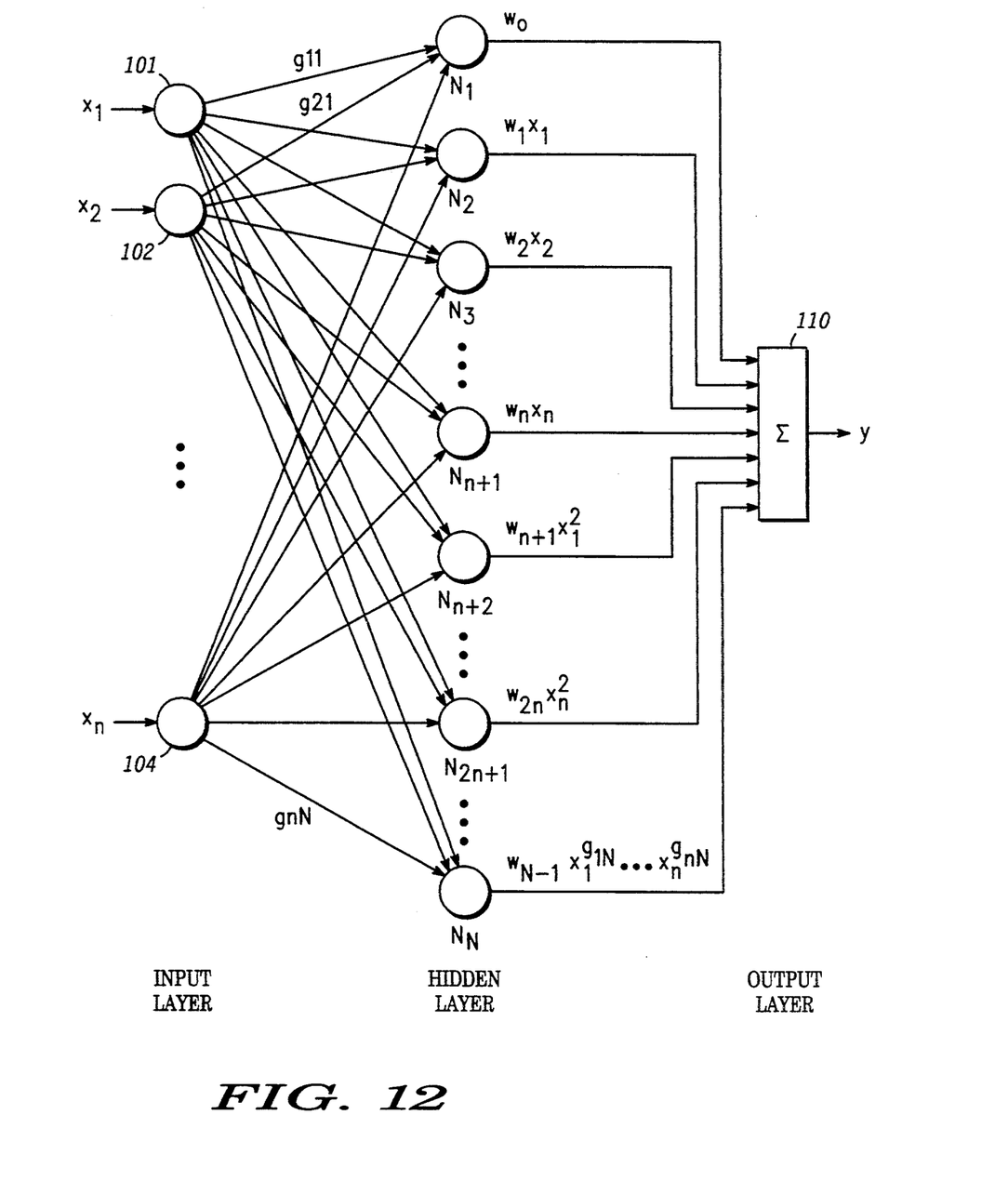
FIG. 12 shows a conceptual diagram of a neural network for performing an expert system computation in accordance with the present invention.

FIG. 12 shows a conceptual diagram of a neural network for performing computations in an expert system which has been converted from an existing expert system in accordance with the present invention. A plurality of Inputs $x_1, x_2, \ldots, x_n$ are fed to Input nodes 101, 102, \ldots, 104 of the Input Layer.

The Output of each Input node 101, 102, and 104 in the Input Layer is coupled to each neuron circuit of the Hidden Layer (of which only neuron circuits $N_1$, $N_2$, $N_3$, $N_{n+1}$, $N_{n+2}$, $N_{2n+1}$, and $N_N$ are shown). For example, the Output of input node 101 is coupled to each of neuron circuits $N_1$, $N_2$, $N_3$, $N_{n+1}$, $N_{n+2}$, $N_{2n+1}$, and $N_N$, and to all other neuron circuits (not shown) in the Hidden Layer.

The same connections are made regarding the Outputs of input nodes 102, 104, and all other input nodes (not shown) in the Input Layer.

As described in Related Invention No. 1, the gated Inputs are first produced by the neuron circuit and then multiplied by the multiplier of the neuron circuit to produce the neuron Outputs.

The Outputs of neuron Circuits $N_1$, $N_2$, $N_3$, $N_{n+1}$, $N_{n+2}$, $N_{2n+1}$, and $N_N$ are summed by summing circuit 110 to produce a network Output y.

As further explained in Related Invention No. 1, the operation of a neural network of the type employed in the present invention is based upon the use of a polynomial expansion and, in a loose sense, the use of an orthogonal function, such as sine, cosine, exponential/logarithmic, Fourier transformation, Legendre polynomial, radial basis function, or the like, or a combination of polynomial expansion and orthogonal functions.

A preferred embodiment employs a polynomial expansion of which the general case is represented by Equation 5 as follows:

$$y = \sum_{i=1}^{\infty} w_{i-1} x_1^{g_{1i}} x_2^{g_{2i}} \ldots x_n^{g_{ni}} \qquad \text{Equation 5}$$

wherein $x_i$ represent the network Inputs and can be a function such as $x_i = f_i(z_j)$, wherein $z_j$ is any arbitrary variable, and wherein the indices i and j may be any positive integers; wherein y represents the Output of the neural network; wherein $w_{i-1}$ represent the weight for the ith neuron; wherein $g_{1i}, \ldots g_{ni}$ represent gating functions for the ith neuron and are integers, being 0 or greater in a preferred embodiment; and n is the number of network Inputs. It will be understood that for practical applications of this neural network i will be a finite number and can be determined from the number of "examples", in the manner described in Invention No. 1 referenced above.

Each term of Equation 5 expresses a neuron Output and the weight and gating functions associated with such neuron. The number of terms of the polynomial expansion to be used in a neural network is based upon a number of factors, including the number of available neurons, the number of training examples, etc. Equation 5 may be expressed alternatively, as disclosed in Related Invention No. 1.

Each term of Equation 5 is produced by the Output of a neuron or neuron circuit. With regard to FIG. 12, for example, neuron circuit $N_1$ produces the term $w_0$. Neuron circuit $N_2$ produces the term $w_1 x_1$. And so on.

In using a preferred embodiment of the present invention, the number of neuron circuits of the neural network is selected to be equal or less than the number of examples presented to the network. An "example" is defined as one set of given Inputs and resulting Outputs.

For the neural network to be useful, the weight of each neuron circuit must be determined. This can be accomplished by the use of an appropriate training algorithm, as described in Related Invention No. 1.

While FIG. 12 shows only one summing circuit in the Output Layer, it will be understood by one of ordinary skill that two or more summing circuits may be used if a particular expert system application requires multiple Outputs.

Decoding of Expert System Outputs

As described above regarding FIG. 2, the values of the Outputs of the subsystems represented by neural networks are between +1 and −1. Therefore, they may need to be decoded to represent their actual values.

Figure 13:
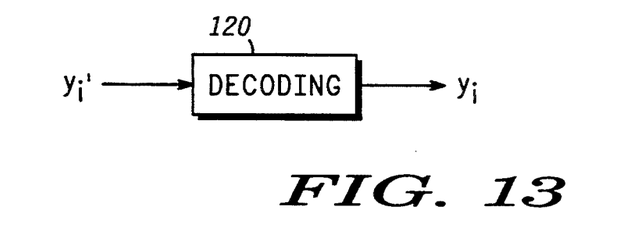
FIG. 13 shows a conceptual diagram of the decoding of a normalized Output value $y'$ to an actual value y.

FIG. 13 shows a conceptual diagram of the decoding of a normalized Output value $y_i'$ to an actual value $y_i$ by suitable decoding formula 120.

It will be understood, for example, regarding Outputs such as Output y shown in FIG. 2, that if such Outputs need to be normalized, normalization will be carried out by suitable means. It will be appreciated that normalization will not be required in every case.

In a preferred embodiment the actual Output y is computed by the following equation:

$$y = ay' + b \qquad \text{Equation 6}$$

While the above is a linear equation between y and y', it will be understood that non-linear relationships between y and y' may be used.

It will be appreciated that an existing expert system comprises a large bundle of Production Rules. Through the method of the present invention, these rules are orderly grouped into a plurality of subsystems, each of which is governed by a selected group of the given Production Rules, which may be expressed by "IF-/THEN" rules, or a table providing the relationship between Inputs and Outputs, or the like. Using the above-described method, each subsystem, as illustrated for example in FIG. 2, can be represented by a neural network of the type shown in FIG. 12. The Production Rules for each subsystem are expressed by a polynomial expansion (e.g. Equation 5), and at least one Output, which may be either an exact Output or an interpolated Output, is computed from the polynomial expansion by substituting at least one Input into the polynomial expansion and solving as explained above.

Conclusion

Thus there has been disclosed a technique for converting an existing expert system into one having at least one neural network. The converted expert system preserves the investment of time and money in creating the Production Rules for the existing expert system. The converted expert system is extremely robust and fast, and it can be used in many time-critical and non-time-critical applications.

It will be understood that the neural networks disclosed and described herein may be implemented either in software or hardware.

Furthermore, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method for converting an existing expert system into an expert system having one or more neural networks, said existing expert system comprising a plurality of external inputs, a plurality of internal inputs, a plurality of internal outputs, at least one external output, a knowledge base, and an inference engine, said method comprising the steps of:
   (a) separating said knowledge base from said inference engine of said existing expert system;
   (b) identifying said external inputs and said at least one external output of said existing expert system;
   (c) identifying said internal inputs and said internal outputs of said existing expert system;
   (d) grouping said inputs and outputs identified in steps (b) and (c) into related subsystems of said existing expert system;
   (e) generating a neural network for each of said subsystems, each neural network being responsive to at least one of said inputs, and each neural network having at least one neural network output for generating at least one subsystem output;

(f) identifying a set of existing production rules for each of said subsystems identified in step (d);

(g) expressing said neural network of each subsystem by a polynomial expansion; and (h) computing the at least one subsystem output based on the at least one output of its respective network by substituting at least one of said inputs into the polynomial expansion.

2. The method recited in claim 1 and further comprising the step of:
(i) training each of said neural networks to learn the set of production rules associated with its respective subsystem.

3. The method recited in claim 1, further comprising the step of interpolating the at least one subsystem output into an interpolated value 4. The method recited in claim 1, further comprising the step of: (i) identifying a temporal or logical relationship among said subsystems identified in step (d).

5. The method of claim 1, wherein step (h) further comprises the substep of normalizing said inputs.

6. The method of claim 5, wherein said normalizing substep is performed by transforming the inputs into values between $-1$ and $+1$.

7. The method of claim 5, wherein said normalizing substep is performed by transforming the inputs into absolute values between 0 and 1.

8. The method of claim 1, wherein step (h) further comprises the substep of normalizing said inputs.

9. The method of claim 8, wherein said normalizing substep is performed by transforming said at least one output into a value between $-1$ and $+1$.

10. The method of claim 8, wherein said normalizing substep is performed by transforming said at least one output into an absolute value between 0 and 1.

11. A method for convening an existing expert system into an expert system having one or more neural networks, said existing expert system comprising a plurality of external inputs, a plurality of internal inputs, a plurality of internal outputs, at least one external output, a knowledge base, and an inference engine, said method comprising the steps of:

(a) separating said knowledge base from said inference engine of said existing expert system;

(b) identifying said external inputs and said at least one external output of said existing expert system;

(c) identifying said internal inputs and said internal outputs of said existing expert system;

(d) grouping said inputs and outputs identified in steps (b) and (c) into related subsystems of said existing expert system;

(e) generating a neural network for each of said subsystems, each neural network being responsive to at least one of said inputs, and each neural network having at least one neural network output for generating at least one subsystem output;

(f) identifying a set of existing production rules in the form of a table for each of said subsystems identified in step (d);

(g) expressing said neural network of each subsystem by a polynomial expansion;

(h) training each of said neural networks to learn the set of production rules associated with its respective subsystem; and (i) computing the at least one subsystem output based on the at least one output of its respective neural network by substituting at least one of said inputs into the polynomial expansion.

12. The method recited in claim 11 further comprising the step of interpolating the at least one subsystem output into an interpolated value.

13. The method recited in claim 11, and further comprising the step of:
(i) identifying a temporal or logical relationship among said subsystems identified in step (d).

14. The method of claim 11, wherein step (h) further comprises the substep of normalizing said inputs.

15. The method claim 14, wherein said normalizing substep is performed by transforming the inputs into values between $-1$ and $+1$.

16. The method of claim 14, wherein said normalizing substep is performed by transforming the inputs into absolute values between 0 and 1.

17. The method of claim 11, wherein step (i) further comprises the substep of normalizing at least one of the outputs.

18. The method of claim 17, wherein said normalizing substep is performed by transforming said at least one output into a value between $-1$ and $+1$.

19. The method of claim 17, wherein said normalizing substep is performed by transforming said at least one output into an absolute value between 0 and 1.

20. A method for convening an existing expert system into an expert system having one or more neural networks, said existing expert system comprising a plurality of external inputs, a plurality of internal inputs, a plurality of internal outputs, at least one external output, a knowledge base, and an inference engine, said method comprising the steps of:

(a) separating said knowledge base from said inference engine of said existing expert system;

(b) identifying said external inputs and said at least one external output of said existing expert system;

(c) identifying said internal inputs and said internal outputs of said existing expert system;

(d) grouping said inputs and outputs identified in steps (b) and (c) into related subsystems of said existing expert system;

(e) identifying a temporal or logical relationship among said subsystems identified in step (d);

(f) generating a neural network for each of said subsystems, each neural network being responsive to at least one of said inputs and each neural network having at least one neural network output for generating at least one subsystem output;

(g) identifying a set of existing production rules for each of said subsystems identified in step (d);

(h) expressing said neural network of each subsystem by a polynomial expansion of the form $$y = \sum_{i=1}^{m} w_{i-1} x_1^{g_{1i}} x_2^{g_{2i}} \ldots x_n^{g_{ni}}$$

wherein variables $x_i$ represent the at least one of said inputs, variables i, j, and m are positive integers, y represents the at least one neural network output, variables $w_{i-1}$ represent the weighting constants, variables $g_{1i}, \ldots, g_{ni}$ represent gating functions and are integers, and n is the number of the at least one of said inputs;

(i) training each of said neural networks to learn the set of production rules associated with its respective subsystem; and (j) computing the at least one subsystem output based on the at least one output of its respective neural network by substituting at least one of said inputs into the polynomial expansion.

21. The method recited in claim 20 further comprising the step of interpolating the at least one subsystem output into an interpolated value.

22. The method of claim 21, wherein step (j) further comprises the substep of normalizing said at least one output.

23. The method of claim 22, wherein said normalizing substep is performed by transforming said at least one output into a value between −1 and +1.

24. The method of claim 22, wherein said normalizing substep is performed by transforming said at least one output into an absolute value between 0 and 1.

25. The method of claim 20, wherein step (j) further comprises the substep of normalizing said at least one input.

26. The method of claim 25, wherein said normalizing substep is performed by transforming said at least one input into a value between −1 and +1.

27. The method of claim 25, wherein said normalizing substep is performed by transforming said at least one input into an absolute value between 0 and 1.

28. The method recited in claim 20 wherein the step of grouping said inputs and outputs further comprises the substep of generating at least one of said sets of production rules in the form of a table.

29. A method for converting an existing expert system into an expert system having one or more neural networks, said existing expert system comprising a plurality of external inputs, a plurality of internal inputs, a plurality of internal outputs, at least one external output, a knowledge base, and an inference engine, said method comprising the steps of:

(a) separating said knowledge base from said inference engine of said existing expert system;

(b) identifying said external inputs and said at least one external output of said existing expert system;

(c) identifying said internal inputs and said internal outputs of said existing expert system;

(d) grouping said inputs and outputs identified in steps (b) and (c) into related subsystems of said existing expert system;

(e) generating a neural network for each of said subsystems, each neural network being responsive to at least one of said inputs, and each neural network having at least one neural network output for generating at least one subsystem output;

(f) identifying a set of existing production rules for each of said subsystems identified in step (d);

(g) expressing said neural network of each subsystem by a polynomial expansion;

(h) computing the at least one subsystem output based on the at least one output of its respective neural network by substituting at least one of said inputs into the polynomial expansion; and (i) interpolating the at least one subsystem output into an interpolated value.

30. A method for convening an existing expert system into an expert system having one or more neural networks, said existing expert system comprising a plurality of external inputs, a plurality of internal inputs, a plurality of internal outputs, at least one external output, a knowledge base, and an inference engine, said method comprising the steps of:

(a) separating said knowledge base from said inference engine of said existing expert system;

(b) identifying said external inputs and said at least one external output of said existing expert system;

(c) identifying said internal inputs and said internal outputs of said existing expert system;

(d) grouping said inputs and outputs identified in steps (b) and (c) into related subsystems of said existing expert system;

(e) generating a neural network for each of said subsystems, each neural network being responsive to at least one of said inputs, and each neural network having at least one neural network output for generating at least one subsystem output;

(f) identifying a set of existing production rules in the form of a table for each of said subsystems identified in step (d);

(g) expressing said neural network of each subsystem by a polynomial expansion;

(h) training each of said neural networks to learn the set of production rules associated with its respective subsystem;

(i) computing the at least one subsystem output based on the at least one output of its respective neural network by substituting at least one of said inputs into the polynomial expansion; and (j) interpolating the at least one subsystem output into an interpolated value.

31. A method for convening an existing expert system into an expert system having one or more neural networks, said existing expert system comprising a plurality of external inputs, a plurality of internal inputs, a plurality of internal outputs, at least one external output, a knowledge base, and an inference engine, said method comprising the steps of:

(a) separating said knowledge base from said inference engine of said existing expert system;

(b) identifying said external inputs and said at least one external output of said existing expert system;

(c) identifying said internal inputs and said internal outputs of said existing expert system;

(d) grouping said inputs and outputs identified in steps (b) and (c) into related subsystems of said existing expert system;

(e) identifying a temporal or logical relationship among said subsystems identified in step (d);

(f) generating a neural network for each of said subsystems, each neural network being responsive to at least one of said inputs, and each neural network having at least one neural network output for generating at least one subsystem output;

(g) identifying a set of existing production rules for each of said subsystems identified in step (d);

(h) expressing said neural network of each subsystem by a polynomial expansion;

(i) training each of said neural networks to learn the set of production rules associated with its respective subsystem;

(j) computing the at least one subsystem output based on the at least one output of its respective neural network by substituting at least one of said inputs into the polynomial expansion; and (k) interpolating the at least one subsystem output into an interpolated value.

* * * * *